July 30, 1957  J. C. GLENN  2,801,088
CARBURETOR
Filed Nov. 15, 1954
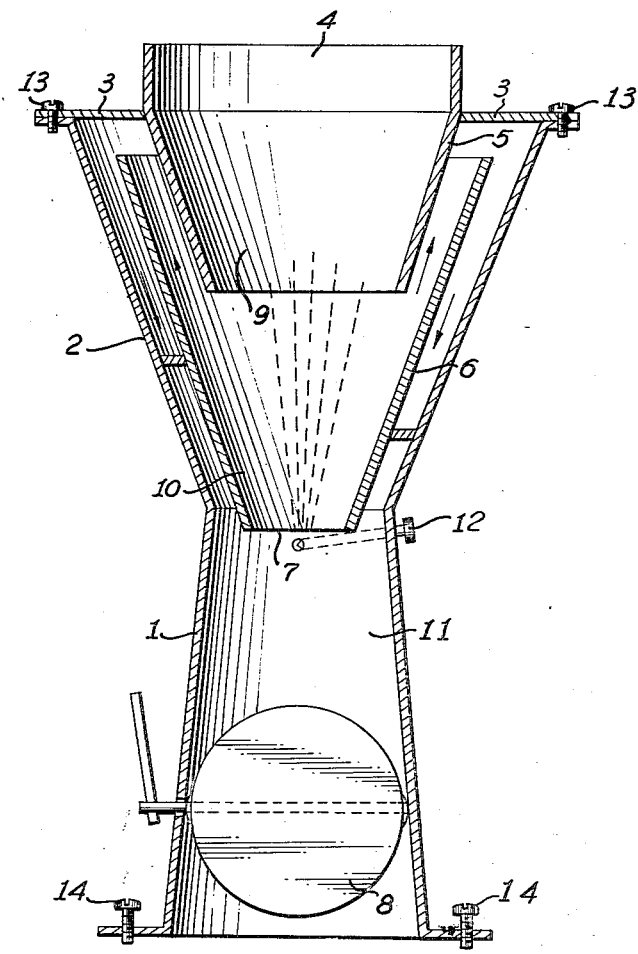
INVENTOR
John Christian Glenn

United States Patent Office 2,801,088
Patented July 30, 1957

2,801,088

CARBURETOR

John Christian Glenn, Avon Park, Fla.

Application November 15, 1954, Serial No. 468,657

2 Claims. (Cl. 261—65)

The carburetor is simple in construction, durable, inexpensive to manufacture, and it is impossible to flood it. There is no choke valve, no booster pump. There is one jet only, a combination adjustable high speed and idling jet.

A feature is the idea of eliminating the choke valve by concentrating all of the air flow at the lower speed direct to the metering orifice, through a constricted opening.

Another feature is the ability to have a plurality of air chambers or channels operating singly and in conjunction and without any valves.

A unique idea is the pre-atomizing of the fuel by steps or stages through a plurality of channels or chambers, subjecting it to numerous beatings.

Another feature is the ability to increase the velocity of the air flow over the metering orifice more between the idling speed and the maximum speed of the engine than in present day carburetors.

Another feature is a carburetor with a plurality of air chambers. One of the chambers is a boss chamber and is the source of all the air supply and a direct air supply to the metering orifice through a constricted opening and an auxiliary reservoir to supply the additional air when needed.

Another idea of my carburetor is that it is built on the principle of reducing the size of the orifice opening to a minimum and increasing the velocity of the air flow over the orifice to compensate.

The down draft principle is applied in my carburetor.

The single figure is a vertical cross-section of the carburetor.

The air enters the air intake 4 at the top of the carburetor; it then passes down through an inverted frustum shaped internal air intake wall 5. This intake wall extends well down into the carburetor.

An inverted frustum shaped container 6 is located in the upper central part of the carburetor and is a part of the carburetor casting. This container has a constricted opening 7 at the lower end.

There are three chambers or channels of air flow in the carburetor; a primary 9, a secondary 10, and a mixing chamber 11.

The primary chamber 9 is the first or "Boss Chamber." It is located in the upper part of the carburetor and is formed by the inner wall of internal air intake wall 5. It has an inlet at the top and an outlet at the bottom. This chamber is the source of all air supply for the carburetor. It is a direct supply of air to the metering orifice, also an auxiliary reservoir to supply the additional air to the other chambers when needed.

The secondary or second chamber 10 is below and adjacent to chamber 9. It is formed by the inner boundary of frustum shaped container 6 and the outer boundary of air intake wall 5 and the inner side of the inner part of the carburetor lid 3. It has an inlet and a plurality of outlets. The inlet is in the top central part of the carburetor, below the outlet of chamber 9 and communicates with same. A constricted opening 7 at the bottom end of container 6 is one of the outlets and the other is over the top of the perimeter of container 6 to mixing chamber 11 and communicates with same.

The mixing chamber 11 is around and below, and adjacent to the secondary chamber 10. It is formed by the inner boundary of the carburetor wall 1 and 2 and the outer side of frustum shaped container 6 and the inner side of the outer part of the carburetor lid 3. This chamber has a plurality of inlets and an outlet. One of the inlets communicates with the bottom outlet of the secondary chamber 10 and the other inlet communicates with the upper outlet of chamber 10, and an outlet at the bottom that communicates with the air intake manifold that is below and adjacent to said chamber. A throttle valve 8 is located in the bottom part of chamber 11.

The carburetor operates as follows: When the throttle valve 8 is open and the starter rotates the engine, a lower air pressure is created in chamber 11 than in chamber 10. The only source of air supply is from the primary chamber 9. The least line of resistance is through opening 7 at the bottom of chamber 10 that is above and adjacent to chamber 11. (Detailed explanation later.) All of the air will continue to flow through the opening 7 until such a time as the increased speed of the engine calls for more air than can be supplied through the constricted opening 7, then the air pressure will start to drop again in container 11. The air then will have to come from some other source and the only way is through the secondary air channel 10 that is at the bottom of chamber 9 and adjacent to chamber 11. The air is supplied to chamber 10 by an opening at the bottom of chamber 9 that is adjacent to chamber 10.

Reversing the operation when the engine is at full speed, the air is entering at the air intake 4, it then passes down through the primary chamber 9, and all that can will pass out through the constricted opening 7 at the bottom of chamber 10, and the balance will pass out over the top of chamber 10 and into chamber 11, and out of the bottom of chamber 11 through the manifold.

In order to have a plurality of chambers and channels of air flow operating singly and in conjunction and without valves, I must keep in mind that air in motion creates a lighter atmospheric pressure. I must agitate the air at certain points and keep it calm at another, all at the same time. To do this I have extended the inverted frustum shaped internal air intake wall 5 well down in the carburetor and into the frustum shaped container 6 with the small end of the container 6 down and around the metering orifice 12 that is below and adjacent to container 6.

This will deopsit the air well down in the lower end of the frustum shaped container 6 and it will be very turbulent at this point. Also the trend of the consolidated driving force of the air as it passes out the lower end of the internal air intake wall 5 will exert a pull on the air in the upper part of chamber 10. As the air in the top part of chamber 10 is of a much greater volume and farther from the source of agitation and out of the path of the air flow, it will be more calm than in the lower part of chamber 10 and will exert a higher atmospheric pressure. This will also keep the air from coming upward. The sides of container 6 prevent any movement of the air outward. The least line of resistance is down and out through the constricted lower opening 7 of container 6 and then to the mixing chamber 11 and out through the air control valve 8 to the manifold. This movement will continue until such a time when the speeding up of the engine will call for more air than can pass through the constricted opening 7 and will create a lower air pressure in chamber 11 than that of chambers 9 and 10. The only source it can come from is through the secondary chamber 10 that is adjacent to chamber 11.

By focusing all of the air through the constricted opening 7 to the metering orifice 12, I am able to get a strong force of air over the metering orifice for the lower speeds and a much better atomizing of the fuel at the lower speeds. As this is the first step in pre-atomizing the fuel, it then will come in contact with the air coming down from the secondary chamber 10 to get the second step of the atomizing in the mixing chamber 11. It will then pass out to the manifold inlet.

Since all of the air passes out through the constricted opening 7 at the lower speeds a variation in the size of the opening will determine the flow of the fuel. The smaller constricted opening 7 the faster the velocity of the air flow over the metering orifice 12 at the lower speeds and a smaller orifice opening will be required and a leaner mixture for the higher speeds. The larger the opening 7 the slower the velocity of air flow over the metering orifice 12 at the lower speeds and a larger orifice opening will be required and a richer mixture for the higher speeds. By this principle I can attain almost any mixture I desire for any speed of the engine.

As you know, in the standard carburetors of today there are two air pressures, one below the air control valve and one above. In my carburetor there are three air pressures, one below the air control valve and two above. The upper part of the mixing chamber and the secondary chamber constitute one of the air pressures above the air control valve and the primary chamber at the top of the carburetor the other. At idling speed of the engine in both cases there is a great difference in the air pressure below and above the air control valve. There is not much difference in the air pressure of the mixing chamber and the primary chamber at the idling speed in my carburetor. This depends on the size of the constricted opening 7. As the engine speeds up the air pressure above and below the air control in both cases will begin to level off at about the same rate. With an abundance of air supplied to the primary chamber through an extra large air intake and an output of air through a constricted opening and an air supply to a secondary chamber, a drop in the air pressure will not be as great as that of the mixing chamber below; and a wider difference in the air pressures will exist at the higher speeds than at the lower. This difference will increase the velocity of air flow over the metering orifice more between the idling speed of the engine and the maximum speed in my carburetor than in present day carburetors, and a richer mixture will be had without increasing the orifice opening.

This carburetor is built on the principle of reducing the orifice opening to a minimum and increasing the flow of air over the orifice more between the idling speeds and the higher speeds than in present day carburetors. This is accomplished by extending the frustum shaped internal air intake wall 5 well down in frustum container 6. By this principle I am able to get the benefit of the concentrated driving force of the rapid flow of air running parallel to the orifice 12 through the constricted opening 7 directly below, plus the gradual increase in the pull from the air coming down from the secondary channel 10 and around the orifice 12. This will increase as the speed of the engine increases. The contour of the outer casing of chamber 6, particularly the bottom portion, will effect the flow of the air upward. This will allow the air to flow more freely or retard it as the case may be.

12 is the adjustable orifice that is to be connected to the supply tank. This tank is not shown in the drawing.

13 are bolts to connect the lid of the carburetor to the carburetor proper.

14 are bolts to connect the carburetor to the engine manifold.

Various modifications may be made without departing from the invention as defined in the appended claims.

I claim:

1. A carburetor having an air induction system, a mixing chamber, a fuel inlet nozzle in said mixing chamber and an air control valve downstream of the nozzle, the air induction system having a first air passage defined by a first inverted frustum shaped wall having an upper inlet and a lower outlet, a second frustum shaped wall surrounding and spaced from the first wall and extending below the top and bottom edges of the first wall, thus providing a second air passage having a lower restricted outlet to said mixing chamber and an upper outlet, a third frustum shaped wall surrounding and spaced from the second wall and extending above the top edge of the second wall, thus providing a third air passage, the inlet of said third air passage communicating with the upper outlet of the said second air passage, the third air passage having a lower outlet discharging to the mixing chamber, the junction of said third air passage inlet and said second air passage upper outlet being constituted by means extending between the top of said third wall and the first mentioned wall, the air control valve regulating flow of fuel-air mixture to an engine manifold associated with the carburetor, the arrangement being such that the air passes in series directly through the first passage and through the restricted outlet of said second passage or in parallel through said restricted outlet and said second and third air passages when the air control valve is open.

2. In a carburetor as claimed in claim 1, the further feature is the admitting of air into the carburetor by an air intake with an internal wall.

References Cited in the file of this patent

UNITED STATES PATENTS

| | | |
|---|---|---|
| 1,238,787 | Kidder | Sept. 4, 1917 |
| 1,263,570 | Chappelle et al. | Apr. 23, 1918 |
| 1,287,990 | Heath | Dec. 17, 1918 |
| 1,308,595 | Kidder | July 1, 1919 |
| 1,398,067 | Csanyi | Nov. 22, 1921 |
| 1,456,135 | Lidholm et al. | May 22, 1923 |
| 1,583,692 | Kousnetzoff | May 4, 1926 |
| 1,809,387 | Melkman | June 9, 1931 |
| 1,940,252 | Hammond | Dec. 19, 1933 |
| 1,973,362 | Weiertz | Sept. 11, 1934 |
| 2,002,732 | Culp | May 28, 1935 |